US012569831B2

(12) United States Patent
Kim et al.

(10) Patent No.: US 12,569,831 B2
(45) Date of Patent: Mar. 10, 2026

(54) METHANE-REFORMING CATALYST AND METHOD FOR PRODUCING SAME

(71) Applicant: LG Chem, Ltd., Seoul (KR)

(72) Inventors: Suji Kim, Daejeon (KR); Jun Yeon Cho, Daejeon (KR); Jun Seon Choi, Daejeon (KR); Jae Soon Choi, Daejeon (KR); Sangjin Kim, Daejeon (KR); Sojin Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 209 days.

(21) Appl. No.: 18/271,961

(22) PCT Filed: Jul. 27, 2022

(86) PCT No.: PCT/KR2022/011080
§ 371 (c)(1),
(2) Date: Jul. 12, 2023

(87) PCT Pub. No.: WO2023/068497
PCT Pub. Date: Apr. 27, 2023

(65) Prior Publication Data
US 2024/0116032 A1     Apr. 11, 2024

(30) Foreign Application Priority Data

Oct. 21, 2021    (KR) ........................ 10-2021-0141052

(51) Int. Cl.
*B01J 37/08* (2006.01)
*B01J 23/00* (2006.01)
(Continued)

(52) U.S. Cl.
CPC ............. *B01J 23/002* (2013.01); *B01J 35/19* (2024.01); *B01J 35/733* (2024.01);
(Continued)

(58) Field of Classification Search
CPC ............... C12Q 1/6827; C12Q 1/6886; C12Q 2600/156; G16B 20/10; G16B 20/20;
(Continued)

(56) References Cited

U.S. PATENT DOCUMENTS

| | | | |
|---|---|---|---|
| 6,440,895 B1 | 8/2002 | Tonkovich et al. | |
| 2003/0007904 A1 | 1/2003 | Tonkovich et al. | |
| 2004/0188326 A1* | 9/2004 | Tonkovich ........... | B01J 37/0225 208/139 |
| 2006/0293173 A1 | 12/2006 | Zhang et al. | |
| 2007/0100190 A1 | 5/2007 | Cimino et al. | |
| 2009/0286677 A1 | 11/2009 | Takeshima et al. | |

(Continued)

FOREIGN PATENT DOCUMENTS

| | | |
|---|---|---|
| CN | 107930626 B | 4/2021 |
| JP | H0557194 A | 3/1993 |
| JP | 2003520675 A | 7/2003 |

(Continued)

OTHER PUBLICATIONS

Search report from International Application No. PCT/KR2022/011080, mailed Nov. 18, 2022.

(Continued)

*Primary Examiner* — Ellen M McAvoy
*Assistant Examiner* — Chantel Graham
(74) *Attorney, Agent, or Firm* — Lerner David LLP

(57) ABSTRACT

The catalyst for methane reformation according to an exemplary embodiment of the present application consists of a porous metal support; and a perovskite-based catalyst component supported on the porous metal support and represented by Chemical Formula 1:

$$Sr_{1-x}A_xTi_{1-y}B_yO_{3-\delta}$$  [Chemical Formula 1]

wherein all the variables are described herein.

17 Claims, 4 Drawing Sheets

(51) Int. Cl.
  *B01J 35/00* (2006.01)
  *B01J 35/70* (2024.01)
  *B01J 37/02* (2006.01)
  *C01B 3/40* (2006.01)

(52) U.S. Cl.
  CPC ....... *B01J 37/0225* (2013.01); *B01J 37/0236* (2013.01); *B01J 37/08* (2013.01); *C01B 3/40* (2013.01); *B01J 2235/00* (2024.01); *C01B 2203/0233* (2013.01); *C01B 2203/1241* (2013.01)

(58) Field of Classification Search
  CPC ........ G16B 30/00; G16B 30/10; G16H 10/40; G16H 20/10; G16H 50/20; Y02A 90/10; B01J 23/002; B01J 23/58; B01J 23/63; B01J 23/78; B01J 23/83; B01J 2523/00; B01J 2523/24; B01J 2523/36; B01J 2523/47; B01J 2523/821; B01J 2523/847; B01J 35/19; B01J 35/733; B01J 37/0225; B01J 37/0236; B01J 37/08; B01J 21/063; B01J 2235/00; B01J 23/02; B01J 23/755; B01J 37/0215; C01B 2203/0233; C01B 2203/0238; C01B 2203/0244; C01B 2203/0261; C01B 2203/1041; C01B 2203/1082; C01B 2203/1241; C01B 3/40; Y02P 20/52
  See application file for complete search history.

(56) References Cited

U.S. PATENT DOCUMENTS

2014/0031200 A1 1/2014 Son et al.
2020/0269217 A1 8/2020 Ko et al.

FOREIGN PATENT DOCUMENTS

JP   2019034256 A   3/2019
KR   20020080387 A   10/2002
KR   20140014869 A   2/2014
KR   101457098 B1   11/2014
KR   101793030 B1   11/2017
KR   101872728 B1   7/2018
KR   20180127267 A   11/2018
KR   20180136701 A   12/2018
KR   101959379 B1   3/2019
KR   101994152 B1   6/2019

OTHER PUBLICATIONS

Sudhakaran, M.S.P: "Dry Reforming of Propane over Y-Al2O3 and Nickel Foam Supported Novel SrNiO3 Perovskite Catalyst", CATALYSTS, vol. 9, Jan. 10, 2019 (Jan. 10, 2019), p. 1-18, XP093163335.
Extended European Search Report including Written Opinion for Application No. 22883727.4 dated Jun. 12, 2024, pp. 1-9.
Sudhakaran M.S.P,, et al., "Dry Reforming of Propane over y-Al2O3 and Nickel Foam Supported Novel SrNiO3 Perovskite Catalyst". Catalysts, Jan. 10, 2019, 9, 68. https://doi.org/10.3390/catal9010068. 18 pgs.

* cited by examiner

[FIG. 1A]
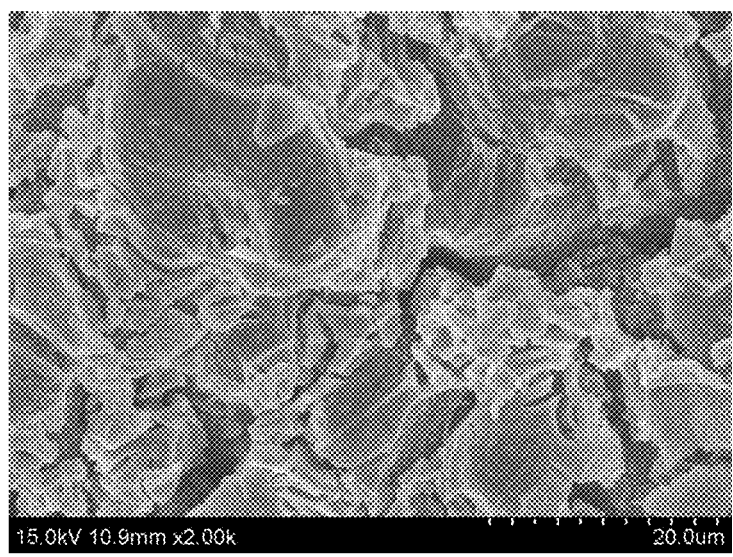
[FIG. 1B]
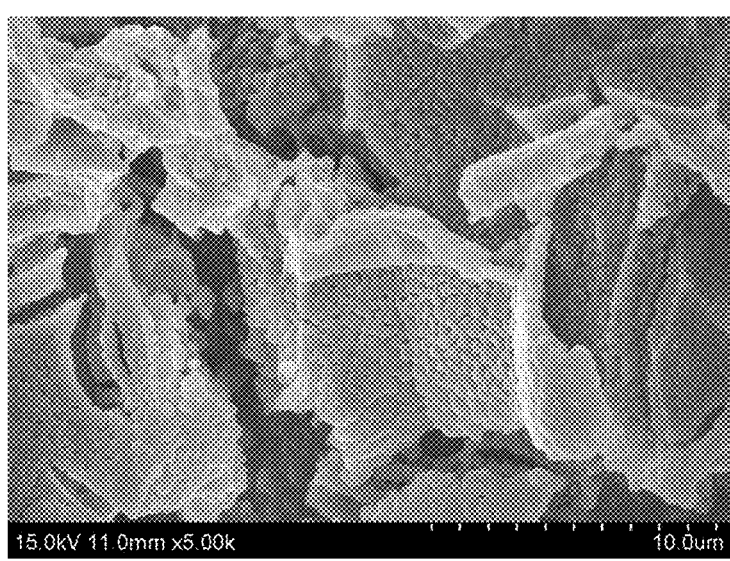

[FIG. 2]
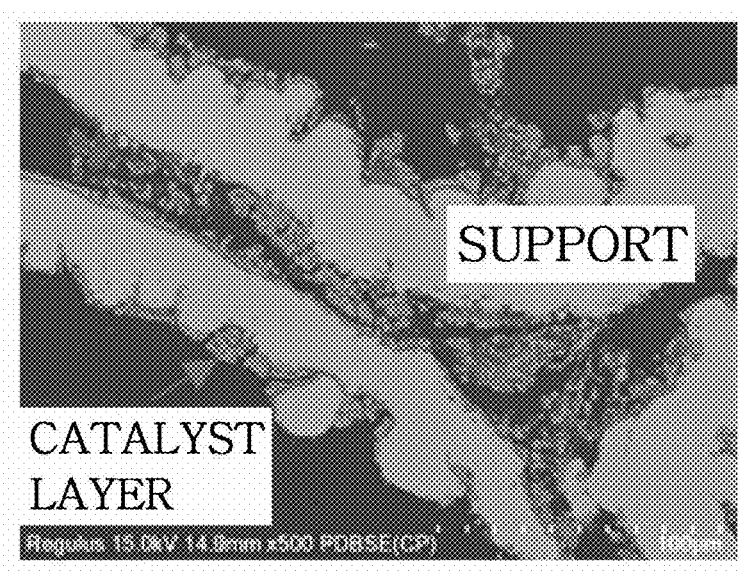

[FIG. 3A]
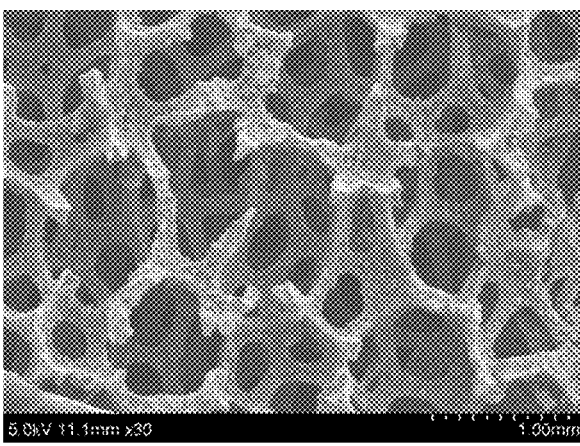
[FIG. 3B]
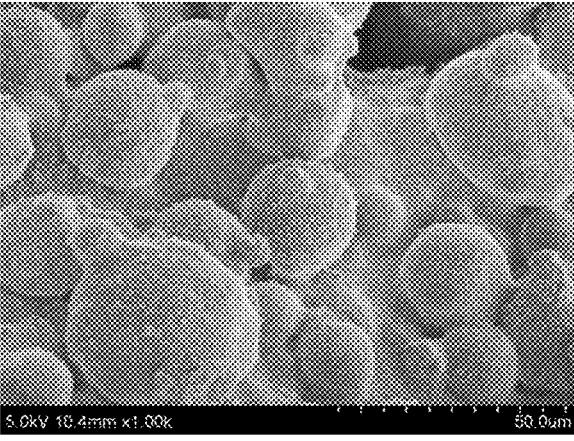
[FIG. 3C]
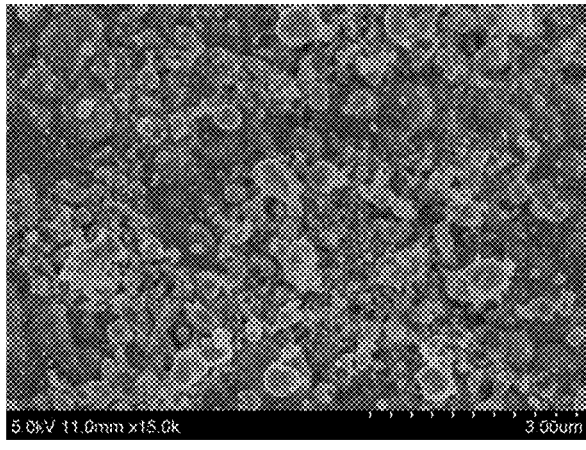

[FIG. 4]
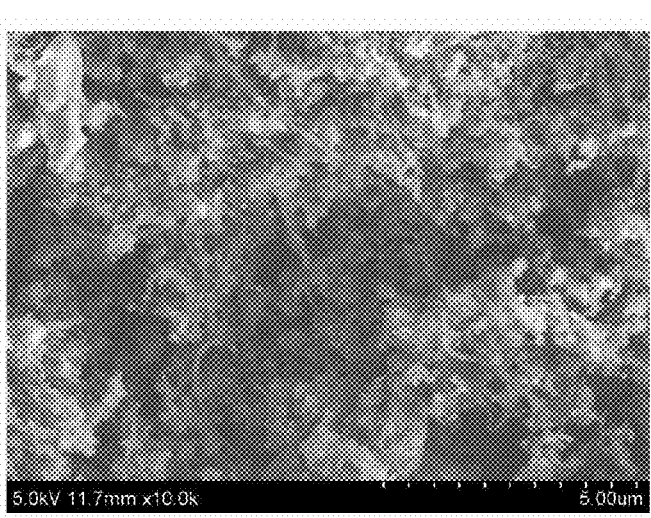

METHANE-REFORMING CATALYST AND METHOD FOR PRODUCING SAME

CROSS-CITATION WITH RELATED APPLICATIONS

This application is a national stage entry under 35 U.S.C. § 371 of International Application No. PCT/KR2022/011080 filed on Jul. 27, 2022, which claims priority from Korean Patent Application No. 10-2021-0141052 filed on Oct. 21, 2021, all the disclosures of which are incorporated herein by reference.

TECHNICAL FIELD

The present application relates to a catalyst for methane reformation and a method for producing the same.

BACKGROUND ART

As part of activities to reduce greenhouse gases caused by global warming, many studies on carbon dioxide conversion technologies have been conducted. The carbon dioxide reforming reaction, one of the carbon dioxide conversion technologies, is a technology to obtain synthesis gas composed of hydrogen and carbon monoxide by reacting methane and carbon dioxide.

Synthesis gas is a material with high development value from diverse downstream raw materials. As a method for industrially obtaining synthesis gas ($H_2$/CO), the reforming reaction of natural gas may be largely divided into steam reforming process, carbon dioxide ($CO_2$) reforming process, catalytic partial oxidation process, autothermal reforming process, tri-reforming process, such as the following Reaction Schemes 1 to 5, and the like.

$$CH_4+H_2O \rightarrow 3H_2+CO \ \Delta H=226 \ kJ/mol \qquad \text{[Reaction Scheme 1]}$$

$$CH_4+CO_2 \rightarrow 2H_2+2CO \ \Delta H=261 \ kJ/mol \qquad \text{[Reaction Scheme 2]}$$

$$CH_4+0.5O_2 \rightarrow 2H_2+CO \ \Delta H=-44 \ kJ/mol \qquad \text{[Reaction Scheme 3]}$$

autothermal reforming: Reaction Scheme 1+Reaction Scheme 3     [Reaction Scheme 4]

tri-reforming: Reaction Scheme 1+Reaction Scheme 2+Reaction Scheme 3     [Reaction Scheme 5]

Meanwhile, various catalysts may be used for reforming activity in the reforming process. Among them, when noble metal catalysts are used in the reforming process, there is an advantage in that the reaction efficiency is high because a relatively low amount of carbon is deposited compared to nickel-based catalysts, but there is a problem in that the economic feasibility deteriorates because noble metal catalysts are expensive.

Accordingly, relatively inexpensive nickel catalysts are usually used in the reforming process. In particular, as the nickel catalyst, a catalyst in which nickel metal is supported on a support such as alumina is often used as a commercial catalyst, but in this case, there is a problem in that the nickel catalyst is deactivated by carbon that is inevitably produced on the surface of the nickel catalyst.

Therefore, there is a need in the art for developing a catalyst which is resistant to carbon deposition and can be effectively applied to the reforming process of methane.

DETAILED DESCRIPTION OF THE INVENTION

Technical Problem

The present application has been made in an effort to provide a catalyst for methane reformation and a method for preparing the same.

Technical Solution

An exemplary embodiment of the present application provides a catalyst for methane reformation, consisting of:
a porous metal support; and
a perovskite-based catalyst component supported on the porous metal support and represented by the following Chemical Formula 1.

$$Sr_{1-x}A_xTi_{1-y}B_yO_{3-\delta} \qquad \text{[Chemical Formula 1]}$$

In Chemical Formula 1,
A is Y, La or Ba,
B is Ni, Co, Fe, Mn, Cr, Mo, Ru or Rh,
x is a real number of 0 or more and less than 1,
y is a real number of more than 0 and less than 0.5, and
δ is a real number of more than 0 and less than 1.

Further, another exemplary embodiment of the present application provides a catalyst comprising:
a porous metal support; and
a metal oxide catalyst supported on the porous metal support,
in which a coefficient of thermal expansion value of the metal oxide catalyst is 84% to 100% of a coefficient of thermal expansion value of the porous metal support at a temperature of 600° C. or more.

In addition, still another exemplary embodiment of the present application provides a method for producing a catalyst for methane reformation, the method comprising:
preparing a solution comprising a precursor of the perovskite-based catalyst component represented by Chemical Formula 1;
coating a porous metal support with the solution comprising the precursor of the perovskite-based catalyst component; and
drying and firing the porous metal support.

Furthermore, yet another exemplary embodiment of the present application provides a method for producing a catalyst, the method comprising:
preparing a precursor solution of a metal oxide catalyst;
coating a porous metal support with the precursor solution of the metal oxide catalyst; and
producing a catalyst in which the metal oxide catalyst is supported on the porous metal support by drying and firing the porous metal support, in which a coefficient of thermal expansion value of the metal oxide catalyst is 84% to 100% of a coefficient of thermal expansion value of the porous metal support at a temperature of 600° C. or more.

Advantageous Effects

The catalyst for methane reformation according to an exemplary embodiment of the present application can be formed in the form of perovskite nanoparticles by directly coating a porous metal support with the perovskite-based catalyst component represented by Chemical Formula 1 without an additional binder. Accordingly, the catalyst is characterized in that the active surface area of the catalyst for methane reformation can be increased.

Further, the catalyst for methane reformation according to an exemplary embodiment of the present application is characterized by being capable of exhibiting good activity even at high space velocity during methane reforming reaction and being stably driven for a long period of time without carbon deposition or a sintering phenomenon because a catalyst component is directly supported on a porous metal support having high thermal conductivity.

In addition, in the catalyst according to an exemplary embodiment of the present application, a metal oxide catalyst can be directly supported on a porous metal support without an additional additive by having a characteristic in which a coefficient of thermal expansion value of the metal oxide catalyst is 84% to 100% of a coefficient of thermal expansion value of the porous metal support at a temperature of 600° C. or more. Therefore, the catalyst can be driven without a reduction in activity of the catalyst even in a high-temperature hydrocarbon reaction for a long period of time, and can be stably driven without deposition of coke or a sintering phenomenon of the catalyst component even at high space velocity.

BRIEF DESCRIPTION OF DRAWINGS

FIG. 1A and FIG. 1B are views illustrating a set of electron microscope photographs of the surface of the catalyst for methane reformation according to Example 1 of the present application.

FIG. 2 is a view illustrating an electron microscope photograph of the cross section of the catalyst for methane reformation according to Example 1 of the present application.

FIG. 3A, FIG. 3B and FIG. 3C are views illustrating a set of electron microscope photographs of the surface of the catalyst according to Example 22 of the present application.

FIG. 4 is a view illustrating an electron microscope photograph of the surface of the catalyst according to Comparative Example 12 of the present application.

BEST MODE

Hereinafter, the present specification will be described in more detail.

When one member is disposed "on" another member in the present specification, this comprises not only a case where the one member is brought into contact with another member, but also a case where still another member is present between the two members.

When one part "comprises" one constituent element in the present specification, unless otherwise specifically described, this does not mean that another constituent element is excluded, but means that another constituent element may be further comprised.

Currently, in the case of catalysts which are widely used in the field of reformers, generally, powder-type catalysts and pellet-type support catalysts are usually used. Although the powder-type catalysts may have excellent performance due to excellent dispersion degree of the catalyst, it is difficult to directly use the powder-type catalyst in the industry. For example, when a reformer is driven using the powder-type catalyst, the catalyst comes out together with a material produced after the reaction, and in this case, the catalyst in the form of a powder gradually accumulates in the stream tube at the exit portion, and eventually, a phenomenon of blocking the entire tube may occur. Therefore, there is a disadvantage in that the powder-type catalysts cannot be used in the commercial reformers used in the industry.

In addition, the pellet-type support catalyst is currently frequently used in industrial reformers. Due to the limitation of the mass transfer rate, the performance deteriorates compared to the powder-type catalyst only in terms of the catalyst performance, but there is an advantage in that the pellet-type support catalyst can be used for a long period of time because a support is used. However, a $\gamma$-$Al_2O_3$ pellet, which is often used as the pellet-type support catalyst, has a weak structural strength, and thus may be easily broken, and accordingly, there is a disadvantage in that a differential pressure in the reactor is generated. Furthermore, since the volume is large due to the characteristics of the pellet-type support catalyst, the volume thereof becomes considerably large when the pellet-type support catalyst is used in a high-capacity reformer. Further, all reforming reactions are sensitive to reaction temperature, but the existing pellet-type catalyst has a disadvantage in that heat is not evenly distributed throughout the reactor due to a large reduction in thermal conductivity.

Thus, the present application intended to alleviate a phenomenon of blocking the stream tube, which is a disadvantage of the powder-type, and improve the heat and mass transfer rates which are a common disadvantage of the powder-type and the pellet-type, through a method of coating a porous metal support catalyst having high heat and mass transfer rates with a catalyst.

Thus, the present application has been made in an effort to provide a catalyst for methane reformation, which is capable of stably maintaining high activity for a long period of time.

The catalyst for methane reformation according to an exemplary embodiment of the present application consists of a porous metal support; and a perovskite-based catalyst component supported on the porous metal support and represented by the following Chemical Formula 1.

$$Sr_{1-x}A_xTi_{1-y}B_yO_{3-\delta} \qquad \text{[Chemical Formula 1]}$$

In Chemical Formula 1,

A is Y, La or Ba,

B is Ni, Co, Fe, Mn, Cr, Mo, Ru or Rh, x is a real number of 0 or more and less than 1, y is a real number of more than 0 and less than 0.5, and $\delta$ is a real number of more than 0 and less than 1.

In an exemplary embodiment of the present application, Chemical Formula 1 may be represented by the following Chemical Formula 2, but is not limited thereto.

$$SrTi_{1-y}B_yO_{3-\delta} \qquad \text{[Chemical Formula 2]}$$

In Chemical Formula 2,

B is Ni, Co, Fe, Mn, Cr, Mo, Ru or Rh, y is a real number of more than 0 and less than 0.5, and $\delta$ is a real number of more than 0 and less than 1.

In an exemplary embodiment of the present application, Chemical Formula 1 may be represented by the following Chemical Formula 3 or 4, but is not limited thereto.

$$SrTi_{1-y}Ni_yO_{3-\delta} \qquad \text{[Chemical Formula 3]}$$

$$Sr_{1-x}Y_xTi_{1-y}Ni_yO_{3-\delta} \qquad \text{[Chemical Formula 4]}$$

In Chemical Formulae 3 and 4, x is a real number of more than 0 and less than 1, y is a real number of more than 0 and less than 0.5, and $\delta$ is a real number of more than 0 and less than 1.

In an exemplary embodiment of the present application, the porous metal support may be composed of a material capable of maintaining thermal stability at a high temperature of 800° C. or more.

In an exemplary embodiment of the present application, the porous metal support may be composed of one or more selected among NiFeCrAl, NiCrAl, stainless steel or inconel.

The porous metal support is a support having various shapes, has a small heat capacity and an excellent heat transfer ability, and thus may be molded into a desired shape for use. The form, size and the like of the porous metal support are not particularly limited, and the porous metal support may have a porosity of 10% to 99%, preferably 50% to 96%. In addition, the porous metal support may have an average pore size of 150 μm to 3,000 μm, 400 μm to 2,000 μm, and 600 μm to 1,700 μm. The porous metal support may be appropriately produced by those skilled in the art using methods known in the art, in consideration of the material, pore size, porosity, and the like of the porous metal support. According to an exemplary embodiment of the present application, a porous metal support having various materials, pore sizes, and the like may be applied as in Examples to be described below.

In an exemplary embodiment of the present application, a content of the perovskite-based catalyst component may be 3 wt % to 40 wt %, 6 wt % to 35 wt %, and 7 wt % to 30 wt %, based on a total weight of the catalyst for methane reformation. When the content of the perovskite-based catalyst component is less than 3 wt % based on the total weight of the catalyst for methane reformation, the reactivity may be lowered due to relatively few active sites on the catalyst surface, so the content is not preferred. Further, when the content of the catalyst component exceeds 40 wt %, a relatively large amount of the catalyst component is contained compared to the porous metal support, making it difficult to maintain the pore structure, it may not be easy to bond the catalyst component to the porous metal support, and accordingly, the practical benefits of the methane reforming reaction may be reduced.

The catalyst for methane reformation according to an exemplary embodiment of the present application can be formed in the form of perovskite nanoparticles by directly coating a porous metal support with the perovskite-based catalyst component represented by Chemical Formula 1 without a separate binder. Accordingly, the catalyst is characterized in that the active surface area of the catalyst for methane reformation can be increased.

In an exemplary embodiment of the present application, the catalyst for methane reformation may be applied to a steam reforming process, a carbon dioxide ($CO_2$) reforming process, a catalytic partial oxidation process, an autothermal reforming process, a tri-reforming process or a mixed reforming process, and the methane reforming process is not particularly limited.

In addition, in the present application, a porous metal support such as a metal foam with low pressure drop was applied as a support for the catalyst because the porous metal support has no problem of an increase in weight due to its mechanical strength similar to that of honeycomb or pellet carriers and low apparent density so as to be applied to high-temperature catalytic reactions, and has excellent porosity. Furthermore, in order to stably introduce catalyst components into the porous metal support, a metal oxide catalyst having a coefficient of thermal expansion (CTE) value similar to that of the porous metal support was supported.

The catalyst according to an exemplary embodiment of the present application comprises: a porous metal support; and a metal oxide catalyst supported on the porous metal support, and a coefficient of thermal expansion value of the metal oxide catalyst is 84% to 100% of a coefficient of thermal expansion value of the porous metal support at a temperature of 600° C. or more.

In the catalyst according to an exemplary embodiment of the present application, details on the porous metal support are as described above.

In an exemplary embodiment of the present application, a coefficient of thermal expansion value of the metal oxide catalyst is 84% to 100% of a coefficient of thermal expansion value of the porous metal support at a temperature of 600° C. or more. In particular, a coefficient of thermal expansion value of the metal oxide catalyst may be 86% to 100% of a coefficient of thermal expansion value of the porous metal support at a temperature of 800° C. to 900° C. When the coefficient of thermal expansion value of the metal oxide catalyst is less than 84% or exceeds 100% of the coefficient of thermal expansion value of the porous metal support, the metal oxide catalyst may be separated from the porous metal support during the cooling/heating process because there is a large difference in coefficient of thermal expansion values between the porous metal support and the metal oxide catalyst. Further, a large difference in coefficient of thermal expansion values between the porous metal support and the metal oxide catalyst may cause cracks in the catalyst, thereby failing to maintain a stable structure of the catalyst.

The coefficient of thermal expansion value may be measured using methods known in the art. More specifically, the coefficient of thermal expansion value may be measured using a thermal mechanical analyzer (TMA), a dilatometer, and the like. A TMA or dilatometer is an apparatus that measures the changes in size and volume of a sample as a function of time, temperature, and force.

As described above, in the catalyst according to an exemplary embodiment of the present application, a metal oxide catalyst can be directly supported on a porous metal support without a separate additive by having a characteristic in which a coefficient of thermal expansion value of the metal oxide catalyst is 84% to 100% of a coefficient of thermal expansion value of the porous metal support at a temperature of 600° C. or more. Therefore, the catalyst may be composed of only the porous metal support; and a metal oxide catalyst directly supported on the porous metal support, and may not comprise an additional additive.

In an exemplary embodiment of the present application, the metal oxide catalyst may be represented by the following Chemical Formula 5.

$$A_xB_yO_{3-\delta} \hspace{2cm} \text{[Chemical Formula 5]}$$

In Chemical Formula 5,

A is one or more selected among Y, La, Ba and Sr,

B is one or more selected among Ni, Co, Fe, Ti, Mn, Cr, Mo, Ru and Rh, x is a real number of more than 0 and 1 or less, y is a real number of more than 0 and 1 or less, and δ is a real number of more than 0 and less than 1.

In an exemplary embodiment of the present application, Chemical Formula 5 may be represented by the following Chemical Formula 6, but is not limited thereto.

$$Sr_{1-x}A'_xTi_{1-y}B'_yO_{3-\delta} \hspace{2cm} \text{[Chemical Formula 6]}$$

In Chemical Formula 6,

A' is Y, La or Ba,

B' is Ni, Co, Fe, Mn, Cr, Mo, Ru or Rh, x' is a real number of 0 or more and less than 1, y' is a real number of more than 0 and less than 0.5, and δ is a real number of more than 0 and less than 1.

In an exemplary embodiment of the present application, Chemical Formula 5 may be represented by the following Chemical Formula 7, but is not limited thereto.

$$SrTi_{1-y'}B'_{y'}O_{3-\delta}$$ [Chemical Formula 7]

In Chemical Formula 7,

B' is Ni, Co, Fe, Mn, Cr, Mo, Ru or Rh, y' is a real number of more than 0 and less than 0.5, and δ is a real number of more than 0 and less than 1.

In an exemplary embodiment of the present application, Chemical Formula 5 may be represented by the following Chemical Formula 8 or 9, but is not limited thereto.

$$SrTi_{1-y'}Ni_{y'}O_{3-\delta}$$ [Chemical Formula 8]

$$Sr_{1-x'}Y_{x'}Ti_{1-y'}Ni_{y'}O_{3-\delta}$$ [Chemical Formula 9]

In Chemical Formulae 8 and 9, x' is a real number of 0 or more and less than 1, y' is a real number of more than 0 and less than 0.5, and δ is a real number of more than 0 and less than 1.

In an exemplary embodiment of the present application, a content of the metal oxide catalyst may be 3 wt % to 40 wt %, 6 wt % to 35 wt %, and 7 wt % to 30 wt %, based on a total weight of the catalyst. When the content of the metal oxide catalyst is less than 3 wt % based on the total weight of the catalyst, the reactivity may be lowered due to relatively few active sites on the catalyst surface, so the content is not preferred. In addition, when the content of the metal oxide catalyst exceeds 40 wt %, a relatively large amount of the catalyst component is contained compared to the porous metal support, making it difficult to maintain the pore structure, it may not be easy to bond the catalyst component to the porous metal support, and accordingly, the practical benefits of the reaction of hydrocarbons may be reduced.

The catalyst according to an exemplary embodiment of the present application may be applied to the reforming reaction, cracking reaction, oxidation reaction, partial oxidation reaction or hydrogenation reaction of hydrocarbons, but is not limited thereto.

In particular, the catalyst according to an exemplary embodiment of the present application may be applied to a reforming reaction of methane, and the reforming reaction of methane may comprise a steam reforming process, a carbon dioxide ($CO_2$) reforming process, a catalytic partial oxidation process, an autothermal reforming process, a tri-reforming process or a mixed reforming process.

The method for producing a catalyst for methane reformation according to an exemplary embodiment of the present application comprises: preparing a solution comprising a precursor of the perovskite-based catalyst component represented by Chemical Formula 1; coating a porous metal support with the solution comprising the precursor of the perovskite-based catalyst component; and drying and firing the porous metal support.

In the method for producing a catalyst for methane reformation according to an exemplary embodiment of the present application, details on the porous metal support, the perovskite-based catalyst component, and the like are the same as those described above.

In particular, in the method for producing a catalyst for methane reformation according to an exemplary embodiment of the present application, a porous metal support may be directly coated with a perovskite-based catalyst component without an additional binder.

The method for producing a catalyst for methane reformation according to an exemplary embodiment of the present application comprises preparing a solution comprising a precursor of the perovskite-based catalyst component represented by Chemical Formula 1.

The precursor of the perovskite-based catalyst component is a precursor of the metal constituting the perovskite-based catalyst component represented by Chemical Formula 1, and the metal molar ratio of the perovskite-based catalyst component represented by Chemical Formula 1 may be adjusted by adjusting the content thereof.

Furthermore, the precursor of the metal is not particularly limited, and ammonium salts, nitrates, carbonates, chlorides of the metal elements, or mixtures thereof may be applied in combination.

The method for producing a catalyst for methane reformation according to an exemplary embodiment of the present application comprises coating a porous metal support with the solution comprising the precursor of the perovskite-based catalyst component. As the coating method, methods known in the art may be used, and dip-coating, wash-coating and the like may be used, but the method is not limited thereto.

The method for producing a catalyst for methane reformation according to an exemplary embodiment of the present application comprises drying and firing the porous metal support after the coating of the porous metal support with the solution comprising the precursor of the perovskite-based catalyst component. The drying may be performed at a temperature of 50° C. to 200° C. for 1 hour to 48 hours, and may be performed at a temperature of 60° C. to 150° C. for 5 hours to 36 hours, but is not limited thereto. Further, the firing may be performed at a temperature of 350° C. to 1100° C. for 1 hour to 10 hours in an air atmosphere, and may be performed at a temperature of 500° C. to 1,000° C. for 1.5 hours to 8 hours in an air atmosphere, but is not limited thereto.

In an exemplary embodiment of the present application, the method may further comprise measuring the weight of the catalyst supported on the porous metal support after the drying and firing. In addition, by measuring the weight of the catalyst supported on the porous metal support, the coating of the above-described porous metal support with the solution comprising the precursor of the perovskite-based catalyst component; and the drying and firing of the porous metal support may be performed repeatedly once to 20 times until a desired amount of catalyst is supported on the porous metal support.

The catalyst for methane reformation according to an exemplary embodiment of the present application is characterized by being capable of exhibiting good activity even at high space velocity during methane reforming reaction and being stably driven for a long period of time without carbon deposition or a sintering phenomenon because a catalyst component is supported on a porous metal support having high thermal conductivity.

Furthermore, the method for producing a catalyst according to an exemplary embodiment of the present application comprises: preparing a precursor solution of the metal oxide catalyst; coating a porous metal support with the precursor solution of the metal oxide catalyst; and producing a catalyst in which the metal oxide catalyst is supported on the porous metal support by drying and firing the porous metal support, and a coefficient of thermal expansion value of the metal oxide catalyst is 84% to 100% of a coefficient of thermal expansion value of the porous metal support at a temperature of 600° C. or more.

In the method for producing a catalyst according to an exemplary embodiment of the present application, details on the porous metal support, the metal oxide catalyst, the drying and firing and the like are the same as those described above.

In the method for producing a catalyst according to an exemplary embodiment of the present application, the coating of the porous metal support with the precursor solution of the metal oxide catalyst may be performed by a sol-gel coating process.

The precursor of the metal oxide catalyst is a precursor of the metal constituting the metal oxide catalyst, and the metal molar ratio of the metal oxide catalyst may be adjusted by adjusting the content thereof. Further, the precursor of the metal is not particularly limited, and ammonium salts, nitrates, carbonates, chlorides of the metal elements, or mixtures thereof may be applied in combination.

MODE FOR INVENTION

Hereinafter, the present application will be described in detail with reference to Examples for specifically describing the present application. However, the Examples according to the present application may be modified in various forms, and it is not interpreted that the scope of the present application is limited to the Examples described in detail below. The Examples of the present application are provided for more completely explaining the present application to the person with ordinary skill in the art.

EXAMPLES

<Example 1> $SrTi_{0.97}Ni_{0.03}O_{3-\delta}$/NiCrAl

A solution comprising a precursor of a perovskite catalyst component was prepared by the citrate method. Strontium nitrate ($Sr(NO_3)_3H_2O$) and nickel nitrate ($Ni(NO_3)_2$) were dissolved in distilled water together with citric acid and ethylene glycol. After titanium isopropoxide ($Ti(OCH(CH_3)_2)_4$) was dissolved in ethanol, the two solutions were mixed at 70° C. Thereafter, after the mixture was stirred for 3 hours, the mixture was cooled to room temperature and stored. In this case, the concentration of the solution was 0.1 M, and nickel was comprised in an amount of 3 mol % relative to titanium.

A porous metal support (NiCrAl, average pore size: 1,200 μm) was dip-coated so as to be impregnated with the solution comprising the precursor of the perovskite catalyst component prepared above, and then dried at 150° C. for 24 hours, and heat-treated at 900° C. in an air atmosphere for 3 hours. This process was repeated several times to finally produce a catalyst in which $SrTi_{0.97}Ni_{0.03}O_{3-\delta}$ ($0<\delta<1$) was supported on a porous metal support. In this case, the amount of $SrTi_{0.97}Ni_{0.03}O_{3-\delta}$ ($0<\delta<1$) supported was 10 wt % based on the total weight of the catalyst.

A set of electron microscope photographs of the surface of the catalyst for methane reformation according to Example 1 of the present application is illustrated in the following FIG. 1A and FIG. 1B. In addition, an electron microscope photograph of the cross section of the catalyst for methane reformation according to Example 1 of the present application is illustrated in the following FIG. 2.

The amount of catalyst supported may be calculated by the following Equation 1.

$$\text{Amount of catalyst supported (wt \%)} = \text{(total weight of catalyst} - \text{weight of porous metal support)} / \text{(total weight of catalyst)} \times 100 \qquad \text{[Equation 1]}$$

<Example 2> $SrTi_{0.95}Ni_{0.05}O_{3-\delta}$/NiCrAl

A catalyst in which $SrTi_{0.95}Ni_{0.05}O_{3-\delta}$ ($0<\delta<1$) was supported on a porous metal support was produced in the same manner as in Example 1, except that the porous metal support was used by increasing the content of nickel to 5 mol % relative to titanium. In this case, the amount of $SrTi_{0.95}Ni_{0.05}O_{3-\delta}$ ($0<\delta<1$) supported was 10 wt % based on the total weight of the catalyst.

<Example 3> $SrTi_{0.90}Ni_{0.10}O_{3-\delta}$/NiCrAl

A catalyst in which $SrTi_{0.90}Ni_{0.10}O_{3-\delta}$ ($0<\delta<1$) was supported on a porous metal support was produced in the same manner as in Example 1, except that the porous metal support was used by increasing the content of nickel to 10 mol % relative to titanium. In this case, the amount of $SrTi_{0.90}Ni_{0.10}O_{3-\delta}$ ($0<\delta<1$) supported was 10 wt % based on the total weight of the catalyst.

<Example 4> $SrTi_{0.85}Ni_{0.15}O_{3-\delta}$/NiCrAl

A catalyst in which $SrTi_{0.85}Ni_{0.15}O_{3-\delta}$ ($0<\delta<1$) was supported on a porous metal support was produced in the same manner as in Example 1, except that the porous metal support was used by increasing the content of nickel to 15 mol % relative to titanium. In this case, the amount of $SrTi_{0.85}Ni_{0.15}O_{3-\delta}$ ($0<\delta<1$) supported was 10 wt % based on the total weight of the catalyst.

<Example 5> $SrTi_{0.8}Ni_{0.20}O_{3-\delta}$/NiCrAl

A catalyst in which $SrTi_{0.80}Ni_{0.20}O_{3-\delta}$ ($0<\delta<1$) was supported on a porous metal support was produced in the same manner as in Example 1, except that the porous metal support was used by increasing the content of nickel to 20 mol % relative to titanium. In this case, the amount of $SrTi_{0.80}Ni_{0.20}O_{3-\delta}$ ($0<\delta<1$) supported was 10 wt % based on the total weight of the catalyst.

<Example 6> $Sr_{0.92}Y_{0.08}Ti_{0.97}Ni_{0.03}O_{3-\delta}$/NiCrAl

A catalyst in which $Sr_{0.92}Y_{0.08}Ti_{0.97}Ni_{0.03}O_{3-\delta}$ ($0<\delta<1$) was supported on a porous metal support was produced in the same manner as in Example 1, except that the porous metal support was used by adding yttrium nitrate ($Y(NO_3)_2$) in an amount of 8 mol % relative to strontium. In this case, the amount of $Sr_{0.92}Y_{0.08}Ti_{0.97}Ni_{0.03}O_{3-\delta}$ ($0<\delta<1$) supported was 10 wt % based on the total weight of the catalyst.

<Example 7> $Sr_{0.92}Y_{0.08}Ti_{0.95}Ni_{0.05}O_{3-\delta}$/NiCrAl

A catalyst in which $Sr_{0.92}Y_{0.08}Ti_{0.95}Ni_{0.05}O_{3-\delta}$ ($0<\delta<1$) was supported on a porous metal support was produced in the same manner as in Example 6, except that the porous metal support was used by increasing the content of nickel to 5 mol % to titanium. In this case, the amount of $Sr_{0.92}Y_{0.08}Ti_{0.95}Ni_{0.05}O_{3-\delta}$ ($0<\delta<1$) supported was 10 wt % based on the total weight of the catalyst.

<Example 8> $Sr_{0.92}Y_{0.08}Ti_{0.90}Ni_{0.10}O_{3-\delta}$/NiCrAl

A catalyst in which $Sr_{0.92}Y_{0.08}Ti_{0.90}Ni_{0.10}O_{3-\delta}$ (0<δ<1) was supported on a porous metal support was produced in the same manner as in Example 6, except that the porous metal support was used by increasing the content of nickel to 10 mol % to titanium. In this case, the amount of $Sr_{0.92}Y_{0.08}Ti_{0.90}Ni_{0.10}O_{3-\delta}$ (0<δ<1) supported was 10 wt % based on the total weight of the catalyst.

<Example 9> $Sr_{0.92}Y_{0.08}Ti_{0.85}Ni_{0.15}O_{3-\delta}$/NiCrAl

A catalyst in which $Sr_{0.92}Y_{0.08}Ti_{0.85}Ni_{0.15}O_{3-\delta}$ (0<δ<1) was supported on a porous metal support was produced in the same manner as in Example 6, except that the porous metal support was used by increasing the content of nickel to 15 mol % to titanium. In this case, the amount of $Sr_{0.92}Y_{0.08}Ti_{0.85}Ni_{0.15}O_{3-\delta}$ (0<δ<1) supported was 10 wt % based on the total weight of the catalyst.

<Example 10> $Sr_{0.92}Y_{0.08}Ti_{0.80}Ni_{0.20}O_{3-\delta}$/NiCrAl

A catalyst in which $Sr_{0.92}Y_{0.08}Ti_{0.80}Ni_{0.20}O_{3-\delta}$ (0<δ<1) was supported on a porous metal support was produced in the same manner as in Example 6, except that the porous metal support was used by increasing the content of nickel to 20 mol % to titanium. In this case, the amount of $Sr_{0.92}Y_{0.08}Ti_{0.80}Ni_{0.20}O_{3-\delta}$ (0<δ<1) supported was 10 wt % based on the total weight of the catalyst.

<Example 11> $Sr_{0.96}Y_{0.04}Ti_{0.80}Ni_{0.20}O_{3-\delta}$/NiCrAl

A catalyst in which $Sr_{0.96}Y_{0.04}Ti_{0.80}Ni_{0.20}O_{3-\delta}$ (0<δ<1) was supported on a porous metal support was produced in the same manner as in Example 10, except that the porous metal support was used by adding yttrium nitrate ($Y(NO_3)_2$) in an amount of 4 mol % relative to strontium. In this case, the amount of $Sr_{0.96}Y_{0.04}Ti_{0.80}Ni_{0.20}O_{3-\delta}$ (0<δ<1) supported was 10 wt % based on the total weight of the catalyst.

<Example 12> $Sr_{0.88}Y_{0.12}Ti_{0.80}Ni_{0.20}O_{3-\delta}$/NiCrAl

A catalyst in which $Sr_{0.88}Y_{0.12}Ti_{0.80}Ni_{0.20}O_{3-\delta}$ (0<δ<1) was supported on a porous metal support was produced in the same manner as in Example 10, except that the porous metal support was used by increasing the content of yttrium nitrate ($Y(NO_3)_2$) to 12 mol % relative to strontium. In this case, the amount of $Sr_{0.88}Y_{0.12}Ti_{0.80}Ni_{0.20}O_{3-\delta}$ (0<δ<1) supported was 10 wt % based on the total weight of the catalyst.

<Example 13> $Sr_{0.84}Y_{0.16}Ti_{0.80}Ni_{0.20}O_{3-\delta}$/NiCrAl

A catalyst in which $Sr_{0.84}Y_{0.16}Ti_{0.80}Ni_{0.20}O_{3-\delta}$ (0<δ<1) was supported on a porous metal support was produced in the same manner as in Example 10, except that the porous metal support was used by increasing the content of yttrium nitrate ($Y(NO_3)_2$) to 16 mol % relative to strontium. In this case, the amount of $Sr_{0.84}Y_{0.16}Ti_{0.80}Ni_{0.20}O_{3-\delta}$ (0<δ<1) supported was 10 wt % based on the total weight of the catalyst.

<Example 14> $Sr_{0.92}Y_{0.08}Ti_{0.90}Ru_{0.10}O_{3-\delta}$/NiCrAl

A catalyst in which $Sr_{0.92}Y_{0.08}Ti_{0.90}Ru_{0.10}O_{3-\delta}$ (0<δ<1) was supported on a porous metal support was produced in the same manner as in Example 8, except that ruthenium chloride ($RuCl_3$) was used in an amount of 10 mol % relative to titanium instead of nickel nitrate ($Ni(NO_3)_2$). In this case, the amount of $Sr_{0.92}Y_{0.08}Ti_{0.90}Ru_{0.10}O_{3-\delta}$ (0<δ<1) supported was 10 wt % based on the total weight of the catalyst.

<Example 15> $Sr_{0.92}Y_{0.08}Ti_{0.85}Ru_{0.15}O_{3-\delta}$/NiCrAl

A catalyst in which $Sr_{0.92}Y_{0.08}Ti_{0.85}Ru_{0.15}O_{3-\delta}$ (0<δ<1) was supported on a porous metal support was produced in the same manner as in Example 14, except that the porous metal support was used by increasing the content of ruthenium chloride ($RuCl_3$) to 15 mol % relative to titanium. In this case, the amount of $Sr_{0.92}Y_{0.08}Ti_{0.85}Ru_{0.15}O_{3-\delta}$ (0<δ<1) supported was 10 wt % based on the total weight of the catalyst.

<Example 16> $Sr_{0.92}Y_{0.08}Ti_{0.80}Ru_{0.20}O_{3-\delta}$/NiCrAl

A catalyst in which $Sr_{0.92}Y_{0.08}Ti_{0.80}Ru_{0.20}O_{3-\delta}$ (0<δ<1) was supported on a porous metal support was produced in the same manner as in Example 14, except that the porous metal support was used by increasing the content of ruthenium chloride ($RuCl_3$) to 20 mol % relative to titanium. In this case, the amount of $Sr_{0.92}Y_{0.08}Ti_{0.80}Ru_{0.20}O_{3-\delta}$ (0<δ<1) supported was 10 wt % based on the total weight of the catalyst.

<Example 17> $Sr_{0.92}Y_{0.08}Ti_{0.80}Ni_{0.20}O_{3-\delta}$/NiCrAl_800

A catalyst in which $Sr_{0.92}Y_{0.08}Ti_{0.80}Ni_{0.20}O_{3-\delta}$ (0<δ<1) was supported on a porous metal support was produced in the same manner as in Example 10, except that as the porous metal support, NiCrAl_800 (average pore size: 800 μm) was used instead of NiCrAl (average pore size: 1,200 μm). In this case, the amount of $Sr_{0.92}Y_{0.08}Ti_{0.80}Ni_{0.20}O_{3-\delta}$ (0<δ<1) supported was 10 wt % based on the total weight of the catalyst.

<Example 18> $Sr_{0.92}Y_{0.08}Ti_{0.80}Ni_{0.20}O_{3-\delta}$/NiCrAl_1500

A catalyst in which $Sr_{0.92}Y_{0.08}Ti_{0.80}Ni_{0.20}O_{3-\delta}$ (0<δ<1) was supported on a porous metal support was produced in the same manner as in Example 10, except that as the porous metal support, NiCrAl_1500 (average pore size: 1,500 μm) was used instead of NiCrAl (average pore size: 1,200 μm). In this case, the amount of $Sr_{0.92}Y_{0.08}Ti_{0.80}Ni_{0.20}O_{3-\delta}$ (0<δ<1) supported was 10 wt % based on the total weight of the catalyst.

<Example 19> $Sr_{0.92}Y_{0.08}Ti_{0.80}Ni_{0.20}O_{3-\delta}$/NiFeCrAl

A catalyst in which $Sr_{0.92}Y_{0.08}Ti_{0.80}Ni_{0.20}O_{3-\delta}$ (0<δ<1) was supported on a porous metal support was produced in the same manner as in Example 10, except that as the porous metal support, NiFeCrAl (average pore size: 1,200 μm) was used instead of NiCrAl (average pore size: 1,200 μm). In this case, the amount of $Sr_{0.92}Y_{0.08}Ti_{0.80}Ni_{0.20}O_{3-\delta}$ (0<δ<1) supported was 10 wt % based on the total weight of the catalyst.

<Example 20> $Sr_{0.92}Y_{0.08}Ti_{0.80}Ru_{0.20}O_{3-\delta}$/NiFeCrAl

A catalyst in which $Sr_{0.92}Y_{0.08}Ti_{0.80}Ru_{0.20}O_{3-\delta}$ (0<δ<1) was supported on a porous metal support was produced in the same manner as in Example 16, except that as the porous metal support, NiFeCrAl (average pore size: 1,200 μm) was used instead of NiCrAl (average pore size: 1,200 μm). In this case, the amount of $Sr_{0.92}Y_{0.08}Ti_{0.80}Ru_{0.20}O_{3-\delta}$ ($0<\delta<1$) supported was 10 wt % based on the total weight of the catalyst.

<Comparative Example 1> $SrTi_{0.97}Ni_{0.03}O_{3-\delta}/$ $Al_2O_3$

A catalyst in which $SrTi_{0.97}Ni_{0.03}O_{3-\delta}$ ($0<\delta<1$) was supported on $Al_2O_3$ was produced in the same manner as in Example 1, except that as the support, $Al_2O_3$ was used instead of the porous metal support (NiCrAl). In this case, the amount of $SrTi_{0.97}Ni_{0.03}O_{3-\delta}$ ($0<\delta<1$) supported was 10 wt % based on the total weight of the catalyst.

<Comparative Example 2> $Sr_{0.92}Y_{0.08}Ti_{0.97}Ni_{0.03}O_{3-\delta}/Al_2O_3$ A catalyst in which $Sr_{0.92}Y_{0.08}Ti_{0.97}Ni_{0.03}O_{3-\delta}$ ($0<\delta<1$) was supported on $Al_2O_3$ was produced in the same manner as in Example 6, except that as the support, $Al_2O_3$ was used instead of the porous metal support (NiCrAl). In this case, the amount of $Sr_{0.92}Y_{0.08}Ti_{0.97}Ni_{0.03}O_{3-\delta}$ ($0<\delta<1$) supported was 10 wt % based on the total weight of the catalyst.

<Comparative Example 3> $SrTi_{0.97}Ni_{0.03}O_{3-\delta}$ (Powder)

Strontium nitrate ($Sr(NO_3)_3H_2O$) and nickel nitrate ($Ni(NO_3)_2$) were dissolved in distilled water together with citric acid and ethylene glycol. After titanium isopropoxide (Ti($OCH(CH_3)_2)_4$) was dissolved in ethanol, the two solutions were mixed at 70° C. After the resulting mixture was stirred for 30 minutes, the mixture was warmed to 100° C. and stirred for 3 hours. In this case, the concentration of the solution was 0.1 M, and nickel was comprised in an amount of 3 mol % relative to titanium. Thereafter, the solution was warmed to 150° C. and dried for 24 hours. The dried body was heat-treated at 350° C. in an air atmosphere for 3 hours, and then ground. Thereafter, a heat treatment was performed again at 900° C. in an air atmosphere for 3 hours. Finally, a $SrTi_{0.97}Ni_{0.03}O_{3-\delta}$ ($0<\delta<1$) catalyst in the form of a powder was produced.

<Comparative Example 4> $Sr_{0.92}Y_{0.08}Ti_{0.97}Ni_{0.03}O_{3-\delta}$ (Powder)

A $Sr_{0.92}Y_{0.08}Ti_{0.97}Ni_{0.03}O_{3-\delta}$ ($0<\delta<1$) catalyst in the form of a powder was finally produced in the same manner as in Comparative Example 3, except that yttrium nitrate ($Y(NO_3)_2$) was additionally used in an amount of 8 mol % relative to strontium.

Comparative Example 5

A porous metal support (NiCrAl, average pore size: 1,200 μm) alone was used as Comparative Example 5.

Comparative Example 6

A porous metal support (NiFeCrAl, average pore size: 1,200 μm) alone was used as Comparative Example 6.

<Comparative Example 7> $SrTi_{0.97}Ni_{0.03}O_{3-\delta}/$ $Al_2O_3/NiCrAl$

A first solution was prepared so as to have 15 wt % of $Al_2O_3$ using an $Al_2O_3$ dispersion solution.

A solution comprising a precursor of the perovskite catalyst component was prepared in the same manner as in Example 1, and named a second solution.

A porous metal support (NiCrAl, average pore size: 1,200 μm) was dip-coated so as to be impregnated with the first solution, and then dried at 150° C. for 24 hours, and heat-treated at 900° C. in an air atmosphere for 3 hours. Thereafter, a porous metal support supported by $Al_2O_3$ of the first solution was dip-coated so as to be impregnated with the second solution, and then dried at 150° C. for 24 hours, and heat-treated at 900° C. in an air atmosphere for 3 hours. This process was repeated several times to finally produce a catalyst in which $Al_2O_3$ and $SrTi_{0.97}Ni_{0.03}O_{3-\delta}$ ($0<\delta<1$) were supported on a porous metal support. In this case, the amount of $SrTi_{0.97}Ni_{0.03}O_{3-\delta}$ ($0<\delta<1$) supported was 10 wt % based on the total weight of the catalyst.

<Comparative Example 8> $SrTi_{0.97}Ni_{0.03}O_{3-\delta}/$ Methyl Cellulose/NiCrAl An experiment was performed in the same manner as in Comparative Example 7, except that methyl cellulose was used instead of $Al_2O_3$ during the preparation of the first solution.

<Experimental Example 1> Evaluation of Reforming Reaction of Methane

A fixed-bed reactor system was introduced to carry out a dry reforming reaction of methane. A Quartz tube reactor (inner diameter=½ inch, length=50 cm) was used to pack the reactor with each catalyst (about 2.5 g) of the Examples and the Comparative Examples. First, after the catalyst underwent a reduction process 800° C. under 10% $H_2/N_2$ conditions for 2 hours, a catalytic reaction was performed for 100 hours.

Gas composition: $CH_4:CO_2:N_2$=1:1.2:0.96

Flow rate: weight hour space velocity (WHSV)=30,000 $h^{-1}$

Reaction temperature: 800° C.

Reaction pressure: 1 bar

A reaction conversion rate after 100 hours of reaction was calculated by analyzing the composition of the produced gas using gas chromatography (GC), and is shown in the following Table 1.

Conversion rate (Xi,%)=[($Fi_{in}$–$Fi_{out}$)/$Fi_{in}$]×100(Fi flow rate of i)

<GC Analysis Conditions>

1) GC model: Agilent 6890

2) Oven temp.: 40° C./7 min-90° C./5 min-180° C./6 min

3) Detector: TCD, 250° C.

4) Sample: 0.25 mL

5) Valve box Temp.: 150° C.

TABLE 1

| Catalyst type | CH₄ conversion rate (%) | CO₂ conversion rate (%) | H₂/CO ratio |
|---|---|---|---|
| Example 1 | 88 | 89.2 | 0.87 |
| Example 2 | 89 | 90.3 | 0.87 |
| Example 3 | 90.2 | 90.3 | 0.89 |

TABLE 1-continued

| Catalyst type | $CH_4$ conversion rate (%) | $CO_2$ conversion rate (%) | $H_2/CO$ ratio |
|---|---|---|---|
| Example 4 | 94.1 | 92.8 | 0.91 |
| Example 5 | 92.1 | 90.9 | 0.89 |
| Example 6 | 61.3 | 71.5 | 0.76 |
| Example 7 | 68.3 | 78.3 | 0.76 |
| Example 8 | 82.7 | 87.5 | 0.87 |
| Example 9 | 92.3 | 90.8 | 0.89 |
| Example 10 | 93.9 | 92 | 0.91 |
| Example 11 | 90.5 | 89.9 | 0.88 |
| Example 12 | 93.5 | 91 | 0.89 |
| Example 13 | 88.7 | 89.2 | 0.87 |
| Example 14 | 89.7 | 88.9 | 0.88 |
| Example 15 | 92.5 | 88.9 | 0.92 |
| Example 16 | 93.2 | 90.8 | 0.92 |
| Example 17 | 90.9 | 90.1 | 0.89 |
| Example 18 | 92.8 | 91.1 | 0.90 |
| Example 19 | 88.4 | 89.1 | 0.87 |
| Example 20 | 87.8 | 89.8 | 0.88 |
| Comparative Example 1 | 44 | 61.2 | 0.64 |
| Comparative Example 2 | 40.9 | 58 | 0.6 |
| Comparative Example 3 | 43.5 | 45.2 | 0.69 |
| Comparative Example 4 | 37.2 | 42.3 | 0.67 |
| Comparative Example 5 | 56 | 65 | 0.79 |
| Comparative Example 6 | 41 | 53 | 0.65 |
| Comparative Example 7 | 44 | 61 | 0.64 |
| Comparative Example 8 | 40.2 | 54 | 0.62 |

As in the above results, it can be confirmed that when the Examples are compared with the Comparative Examples, the catalyst for methane reformation, which is composed of the porous metal support according to the present invention and the perovskite-based catalyst component represented by Chemical Formula 1, has excellent $CH_4$ conversion rate and $CO_2$ conversion rate compared to catalysts to which $Al_2O_3$ in the related art is applied as a support (Comparative Examples 1 and 2), catalysts to which the perovskite-based catalyst component is applied alone (Comparative Examples 3 and 4) and catalyst to which the porous metal support is applied alone (Comparative Examples 5 and 6). This can be seen as an effect of maximizing the active surface using a porous metal support and minimizing carbon deposition by supporting a perovskite-based catalyst component.

Furthermore, it can be confirmed that a catalyst obtained by additionally supporting a catalyst to which $Al_2O_3$ in the related art is applied as a support on a porous metal support (Comparative Example 7) and a catalyst in which a perovskite-based catalyst component is supported on a porous metal support using an organic binder such as methyl cellulose (Comparative Example 8) also have remarkably low $CH_4$ conversion rate and $CO_2$ conversion rate compared to the catalyst for methane reformation according to the present invention.

Therefore, the catalyst for methane reformation according to an exemplary embodiment of the present application can be formed in the form of perovskite nanoparticles by directly coating a porous metal support with the perovskite-based catalyst component represented by Chemical Formula 1 without an additional binder. Accordingly, the catalyst is characterized in that the active surface area of the catalyst for methane reformation can be increased.

Further, the catalyst for methane reformation according to an exemplary embodiment of the present application is characterized by being capable of exhibiting good activity even at high space velocity during methane reforming reaction and being stably driven for a long period of time without carbon deposition or a sintering phenomenon because a catalyst component is supported on a porous metal support having high thermal conductivity.

<Example 21> $SrTi_{0.97}Ni_{0.03}O_{3-\delta}$/NiCrAl

A precursor solution of a metal oxide catalyst was prepared by the citrate method (Pechini method). Strontium nitrate ($Sr(NO_3)_3H_2O$) and nickel nitrate ($Ni(NO_3)_2$) were dissolved in distilled water along with citric acid. After titanium isopropoxide ($Ti(OCH(CH_3)_2)_4$) was dissolved in ethylene glycol, the two solutions were mixed at 70° C. to 90° C. Thereafter, after a clear solution was obtained, the solution was cooled to room temperature and stored. In this case, the concentration of the solution was 0.1 M, and nickel was comprised in an amount of 3 mol % relative to titanium.

A porous metal support (NiCrAl, cell size: 1,200 μm) was coated so as to be impregnated with the precursor solution of the metal oxide catalyst prepared above, and then dried at 70° C. for 24 hours, and heat-treated at 900° C. in an air atmosphere for 3 hours. This process was repeated several times to finally produce a catalyst in which $SrTi_{0.97}Ni_{0.03}O_{3-\delta}$ (0<δ<1) was supported on a porous metal support. In this case, the amount of $SrTi_{0.97}Ni_{0.03}O_{3-\delta}$ (0<δ<1) supported was 15 wt % based on the total weight of the catalyst.

The amount of catalyst supported may be calculated by the following Equation 1.

$$\text{Amount of catalyst supported (wt \%)=(total weight of catalyst−weight of porous metal support)/ (total weight of catalyst)×100} \qquad \text{[Equation 1]}$$

<Example 22> $Sr_{0.92}Y_{0.08}Ti_{0.85}Ni_{0.15}O_{3-\delta}$/NiCrAl

A catalyst in which $Sr_{0.92}Y_{0.08}Ti_{0.85}Ni_{0.15}O_{3-\delta}$ (0<δ<1) was supported on a porous metal support was produced in the same manner as in Example 21, except that the porous metal support was used by adding yttrium nitrate ($Y(NO_3)_2$) in an amount of 8 mol % relative to strontium and increasing the content of nickel to 15 mol % relative to titanium. In this case, the amount of $Sr_{0.92}Y_{0.08}Ti_{0.85}Ni_{0.15}O_{3-\delta}$ (0<δ<1) supported was 15 wt % based on the total weight of the catalyst.

A set of electron microscope photographs of the surface of the catalyst according to Example 22 is illustrated in the following FIG. 3A, FIG. 3B and FIG. 3C.

<Example 23> $Sr_{0.92}Y_{0.08}Ti_{0.85}Ru_{0.15}O_{3-\delta}$/NiCrAl

A catalyst in which $Sr_{0.92}Y_{0.08}Ti_{0.85}Ru_{0.15}O_{3-\delta}$ (0<δ<1) was supported on a porous metal support was produced in the same manner as in Example 21, except that yttrium nitrate ($Y(NO_3)_2$) was added in an amount of 8 mol % relative to strontium, and ruthenium chloride ($RuCl_3$) was used in an amount of 15 mol % relative to titanium instead of nickel nitrate ($Ni(NO_3)_2$). In this case, the amount of $Sr_{0.92}Y_{0.08}Ti_{0.85}Ru_{0.15}O_{3-\delta}$ (0<δ<1) supported was 15 wt % based on the total weight of the catalyst.

<Comparative Example 9> $SrTi_{0.97}Ni_{0.03}O_{3-\delta}$/ $Al_2O_3$

A catalyst in which $SrTi_{0.97}Ni_{0.03}O_{3-\delta}$ (0<δ<1) was supported on $Al_2O_3$ was produced in the same manner as in Example 21, except that as the support, $Al_2O_3$ was applied instead of the porous metal support (NiCrAl, cell size: 1,200 μm). In this case, the amount of $SrTi_{0.97}Ni_{0.03}O_{3-\delta}$ (0<δ<1) supported was 15 wt % based on the total weight of the catalyst.

<Comparative Example 10>
$Sr_{0.92}Y_{0.08}Ti_{0.85}Ni_{0.15}O_{3-\delta}/Al_2O_3$ A catalyst in which $Y_{0.08}Ti_{0.85}Ni_{0.15}O_{3-\delta}$ (0<δ<1) was supported on $Al_2O_3$ was produced in the same manner as in Example 22, except that as the support, $Al_2O_3$ was applied instead of the porous metal support (NiCrAl, cell size: 1,200 μm). In this case, the amount of $Sr_{0.92}Y_{0.08}Ti_{0.85}Ni_{0.15}O_{3-\delta}$ (0<δ<1) supported was 15 wt % based on the total weight of the catalyst.

<Comparative Example 11> $SrTiO_3/NiCrAl$

A precursor solution of a metal oxide catalyst was prepared by the citrate method. Strontium nitrate ($Sr(NO_3)$ An electron microscope photograph of the surface of the catalyst according to Comparative Example 12 is illustrated in the following FIG. 4.

Comparative Example 13

A porous metal support (NiCrAl, Cell size: 1,200 μm) alone was used as Comparative Example 13.

<Experimental Example 2> Evaluation of Coefficient of Thermal Expansion Value

The coefficient of thermal expansion values of the supports and the metal oxide catalysts applied to Examples 21 to 23 and Comparative Examples 9 to 11 were measured, and are shown in the following Table 2.

The coefficient of thermal expansion values were measured under measurement conditions of load 0.1 N and $N_2$ flow 100 ml/min using TMA equipment (TA Instrument, Q400).

TABLE 2

| | Coefficient of thermal expansion value ($10^{-6}$/K) | | | | | | | | |
|---|---|---|---|---|---|---|---|---|---|
| | 600° C. | | | 800° C. | | | 900° C. | | |
| | Support | Catalyst | Percentage | Support | Catalyst | Percentage | Support | Catalyst | Percentage |
| Example 21 | 14.4 | 12.3 | 85% | 15.0 | 13.2 | 88% | 15.4 | 13.3 | 86% |
| Example 22 | 14.4 | 12.3 | 85% | 15.0 | 13.4 | 89% | 15.4 | 13.5 | 88% |
| Example 23 | 14.4 | 12.4 | 86% | 15.0 | 13.3 | 89% | 15.4 | 13.4 | 87% |
| Comparative Example 9 | 9.5 | 12.3 | 129% | 9.6 | 13.2 | 138% | 9.8 | 13.3 | 136% |
| Comparative Example 10 | 9.5 | 12.3 | 129% | 9.6 | 13.4 | 140% | 9.8 | 13.5 | 138% |
| Comparative Example 11 | 14.4 | 11.1 | 77% | 15.0 | 12.2 | 81% | 15.4 | 12.7 | 82% |

$_3H_2O$) was dissolved in distilled water together with critic acid and ethylene glycol. After titanium isopropoxide (Ti $(OCH(CH_3)_2)_4$) was dissolved in ethanol, the two solutions were mixed at 70° C. Thereafter, after the mixture was stirred for 3 hours, the mixture was cooled to room temperature and stored. In this case, the concentration of the solution was 0.1 M.

A porous metal support (NiCrAl, cell size: 1,200 μm) was coated so as to be impregnated with the precursor solution of the metal oxide catalyst prepared above, and then dried at 70° C. for 24 hours, and heat-treated at 900° C. in an air atmosphere for 3 hours. This process was repeated several times to finally produce a catalyst in which $SrTiO_3$ was supported on a porous metal support. In this case, the amount of $SrTiO_3$ supported was 15 wt % based on the total weight of the catalyst.

<Comparative Example 12> $NiO_2/Al_2O_3$

After nickel nitrate ($Ni(NO_3)_2$) was dissolved in distilled water, $NiO_2$ was supported on an $Al_2O_3$ support using an incipient wetness method. In this case, the amount of $NiO_2$ supported was 15 wt % based on the total weight of the catalyst.

Percentage: coefficient of thermal expansion value of catalyst/coefficient of thermal expansion value of support× 100

<Experimental Example 3> Evaluation of Reforming Solution of Methane

A fixed-bed reactor system was introduced to carry out a dry reforming reaction of methane. A Quartz tube reactor (inner diameter=½ inch, length=50 cm) was used to pack the reactor with each catalyst (about 2.5 g) of the Examples and the Comparative Examples. First, after the catalyst underwent a reduction process 800° C. under 10% $H_2/N_2$ conditions for 2 hours, a catalytic reaction was performed for 100 hours.

Gas composition: $CH_4$:$CO_2$:$N_2$=1:1.12:0.96

Flow rate: gas hour space velocity (GHSV, based on $CH_4$)=1,000 $hr^{-1}$ to 3,150 $hr^{-1}$ Reaction temperature: 800° C.

Reaction pressure: 1 bar

A reaction conversion rate after 24 hours of reaction was calculated by analyzing the composition of the produced gas using gas chromatography (GC), and is shown in the following Table 3.

Conversion rate(Xi,%)=[(Fi$_{in}$−Fi$_{out}$)/Fi$_{in}$]×100
(Fi=flow rate of i)

<GC Analysis Conditions>
  1) GC model: Agilent 6890
  2) Oven temp.: 40° C./7 min-90° C./5 min-180° C./6 min
  3) Detector: TCD, 250° C.
  4) Sample: 0.25 mL
  5) Valve box Temp.: 150° C.

TABLE 3

| Catalyst type | GHSV($h^{-1}$) | $CH_4$ conversion rate (%) | $CO_2$ conversion rate (%) |
|---|---|---|---|
| Example 21 | 1,000 | 85.9 | 87.2 |
| Example 21 | 1,500 | 78.3 | 82.7 |
| Example 22 | 1,000 | 94.6 | 92.4 |
| Example 22 | 1,500 | 91.3 | 92.9 |
| Example 23 | 1,000 | 93.8 | 91.0 |
| Example 23 | 1,500 | 87.2 | 86.8 |
| Comparative Example 9 | 1,480 | 43.3 | 60.4 |
| Comparative Example 10 | 1,450 | 72.1 | 78.3 |
| Comparative Example 11 | 3,000 | 10.0 | 11.0 |
| Comparative Example 12 | 3,150 | 53.6 | 58.0 |
| Comparative Example 13 | 1,400 | 32.3 | 42.3 |

As in the above results, it can be confirmed that the catalyst according to an exemplary embodiment of the present application has excellent methane conversion rate and $CO_2$ conversion rate during the reforming reaction of methane.

In the catalyst according to an exemplary embodiment of the present application, a metal oxide catalyst can be directly supported on a porous metal support without an additional additive by having a characteristic in which a coefficient of thermal expansion value of the metal oxide catalyst is 84% to 100% of a coefficient of thermal expansion value of the porous metal support at a temperature of 600° C. or more.

Therefore, according to an exemplary embodiment of the present application, the catalyst can be driven without a reduction in activity of the catalyst even in a high-temperature hydrocarbon reaction for a long period of time, and can be stably driven without deposition of coke or a sintering phenomenon of the catalyst component even at high space velocity.

The invention claimed is:

1. A catalyst for methane reformation, consisting of:
a porous metal support; and
a perovskite-based catalyst component supported on the porous metal support and represented by Chemical Formula 1,
wherein the porous metal support comprises NiFeCrAl or NiCrAl:

$$Sr_{1-x}A_xTi_{1-y}B_yO_{3-\delta}$$   [Chemical Formula 1]

wherein, in Chemical Formula 1,
A is Y, La or Ba,
B is Ni, Co, Fe, Mn, Cr, Mo, Ru or Rh,
x is a real number of 0 or more and less than 1,
y is a real number of more than 0 and less than 0.5, and
δ is a real number of more than 0 and less than 1.

2. The catalyst of claim 1, wherein Chemical Formula 1 is represented by Chemical Formula 2:

$$SrTi_{1-y}B_yO_{3-\delta}$$   [Chemical Formula 2]

in Chemical Formula 2,
B is Ni, Co, Fe, Mn, Cr, Mo, Ru or Rh,
y is a real number of more than 0 and less than 0.5, and
δ is a real number of more than 0 and less than 1.

3. The catalyst of claim 1, wherein Chemical Formula 1 is represented by Chemical Formula 3 or 4:

$$SrTi_{1-y}Ni_yO_{3-\delta}$$   [Chemical Formula 3]

$$Sr_{1-x}Y_xTi_{1-y}Ni_yO_{3-\delta}$$   [Chemical Formula 4]

in Chemical Formulae 3 and 4,
x is a real number of more than 0 and less than 1,
y is a real number of more than 0 and less than 0.5, and
δ is a real number of more than 0 and less than 1.

4. The catalyst of claim 1, wherein a content of the perovskite-based catalyst component is 3 wt % to 40 wt % based on a total weight of the catalyst.

5. The catalyst of claim 1, wherein the catalyst is applied to a steam reforming process, a carbon dioxide ($CO_2$) reforming process, a catalytic partial oxidation process, an autothermal reforming process, a tri-reforming process or a mixed reforming process.

6. A catalyst comprising:
a porous metal support; and
a metal oxide catalyst supported on the porous metal support,
wherein the porous metal support comprises NiFeCrAl or NiCrAl, and
wherein a coefficient of thermal expansion value of the metal oxide catalyst is 84% to 100% of a coefficient of thermal expansion value of the porous metal support at a temperature of 600° C. or more.

7. The catalyst of claim 6, wherein the metal oxide catalyst is represented by Chemical Formula 5:

$$A_xB_yO_{3-\delta}$$   [Chemical Formula 5]

in Chemical Formula 5,
A is one or more selected among Y, La, Ba or Sr,
B is one or more selected among Ni, Co, Fe, Ti, Mn, Cr, Mo, Ru or Rh,
x is a real number of more than 0 and 1 or less,
y is a real number of more than 0 and 1 or less, and
δ is a real number of more than 0 and less than 1.

8. A method for producing a catalyst for methane reformation, the method comprising:
preparing a solution comprising a precursor of a perovskite-based catalyst component represented by Chemical Formula 1;
coating a porous metal support with the solution; and
performing drying and firing,
wherein the porous metal support comprises NiFeCrAl or NiCrAl:

$$Sr_{1-x}A_xTi_{1-y}B_yO_{3-\delta}$$   [Chemical Formula 1]

wherein, in Chemical Formula 1,
A is Y, La or Ba,
B is Ni, Co, Fe, Mn, Cr, Mo, Ru or Rh,
x is a real number of 0 or more and less than 1,
y is a real number of more than 0 and less than 0.5, and
δ is a real number of more than 0 and less than 1.

9. The method of claim 8, wherein Chemical Formula 1 is represented by Chemical Formula 2:

$$SrTi_{1-y}B_yO_{3-\delta}$$   [Chemical Formula 2]

in Chemical Formula 2,
B is Ni, Co, Fe, Mn, Cr, Mo, Ru or Rh,
y is a real number of more than 0 and less than 0.5, and
δ is a real number of more than 0 and less than 1.

10. The method of claim 8, wherein Chemical Formula 1 is represented by Chemical Formula 3 or 4:

$$SrTi_{1-y}Ni_yO_{3-\delta} \qquad \text{[Chemical Formula 3]}$$

$$Sr_{1-x}Y_xTi_{1-y}Ni_yO_{3-\delta} \qquad \text{[Chemical Formula 4]}$$

in Chemical Formulae 3 and 4, x is a real number of more than 0 and less than 1, y is a real number of more than 0 and less than 0.5, and $\delta$ is a real number of more than 0 and less than 1.

11. A method for preparing the catalyst of claim 6, the method comprising:

preparing a solution comprising a precursor of the metal oxide catalyst;

coating the porous metal support with the solution;

performing drying and firing; and producing the catalyst.

12. The method of claim 11, wherein the metal oxide catalyst is represented by Chemical Formula 5:

$$A_xB_yO_{3-\delta} \qquad \text{[Chemical Formula 5]}$$

in Chemical Formula 5,

A is one or more selected among Y, La, Ba or Sr,

B is one or more selected among Ni, Co, Fe, Ti, Mn, Cr, Mo, Ru or Rh, x is a real number of more than 0 and 1 or less, y is a real number of more than 0 and 1 or less, and $\delta$ is a real number of more than 0 and less than 1.

13. The catalyst of claim 1, wherein the porous metal support has a porosity of 10% to 99%.

14. The catalyst of claim 1, wherein the porous metal support has an average pore size of 150 μm to 3,000 μm.

15. The catalyst of claim 6, wherein the porous metal support has a porosity of 10% to 99%.

16. The catalyst of claim 6, wherein the porous metal support has an average pore size of 150 μm to 3,000 μm.

17. The catalyst of claim 6, wherein a content of the metal oxide catalyst is 3 wt % to 40 wt %, based on a total weight of the catalyst.

\* \* \* \* \*